(12) United States Patent
Lin et al.

(10) Patent No.: US 7,985,064 B2
(45) Date of Patent: Jul. 26, 2011

(54) LENS MOLD WITH SLIDES

(75) Inventors: Hou-Yao Lin, Taipei Hsien (TW);
Sheng-Jung Yu, Taipei-Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 85 days.

(21) Appl. No.: 12/464,885

(22) Filed: May 13, 2009

(65) Prior Publication Data

US 2009/0324769 A1 Dec. 31, 2009

(30) Foreign Application Priority Data

Jun. 30, 2008 (CN) .......................... 2008 1 0302485

(51) Int. Cl.
*B29C 45/27* (2006.01)

(52) U.S. Cl. ... 425/443; 425/572; 425/588; 425/DIG. 5; 425/808

(58) Field of Classification Search .................. 425/588, 425/589, 572, 577, 190, 441, 443, 541.9, 425/330, 542, DIG. 58, DIG. 5, 808, 451.9
See application file for complete search history.

(56) References Cited

U.S. PATENT DOCUMENTS

| | | | | |
|---|---|---|---|---|
| 3,811,645 A | * | 5/1974 | Feist | 249/68 |
| 3,843,088 A | * | 10/1974 | McLoughlin et al. | 249/144 |
| 4,540,534 A | * | 9/1985 | Grendol | 264/2.2 |
| 5,160,752 A | * | 11/1992 | Urayama et al. | 425/577 |
| 5,415,817 A | * | 5/1995 | Shiao et al. | 264/2.2 |
| 5,716,540 A | * | 2/1998 | Matiacio et al. | 249/117 |
| 5,718,849 A | * | 2/1998 | Maus et al. | 264/2.2 |
| 6,015,514 A | * | 1/2000 | Koseko | 264/40.1 |
| 6,461,141 B1 | * | 10/2002 | Harrison et al. | 425/556 |
| 6,499,986 B1 | * | 12/2002 | Saito | 425/190 |
| 6,565,346 B2 | * | 5/2003 | Kanematsu et al. | 425/130 |
| 2004/0096539 A1 | * | 5/2004 | McCaffrey et al. | 425/547 |
| 2005/0179148 A1 | * | 8/2005 | Tridon et al. | 264/1.32 |

* cited by examiner

*Primary Examiner* — Yogendra N Gupta
*Assistant Examiner* — Emmanuel S Luk
(74) *Attorney, Agent, or Firm* — Raymond J. Chew

(57) ABSTRACT

A lens mold comprises a first pressing portion, a second pressing portion, and a shaping portion disposed between the two, which comprises an upper slide and a lower slide. The upper slide and the lower slide are connected to the second pressing portion, and can slide along each other. A mold cavity in fluidic communication with a flow path and the inlet such that the lens material flows from the inlet to the mold cavity along the flow path to form a shaped lens. After the lens is formed, the upper slide and the lower slide away from each other separately, where a part of the shaped lens is remains in a recess defined in the second pressing portion, to help release the shaped lens from the mold.

6 Claims, 4 Drawing Sheets

LENS MOLD WITH SLIDES

BACKGROUND

1. Technical Field

The disclosure is related to lenses, and particularly, to a projection shaping mold for plastic lenses.

2. Description of Related Art

As electronic devices are produced with increasingly small profiles, lenses for smaller devices must be thinner than before. Plastic lenses for electronic devices are often shaped and formed in a mold where removal of the plastic lenses from the mold is often done by a pushing pin. However, after being shaped, a thin lens may be easily damaged when pushed from the mold in the manner described, resulting in poor yield.

DETAILED DESCRIPTION

Figure 1:
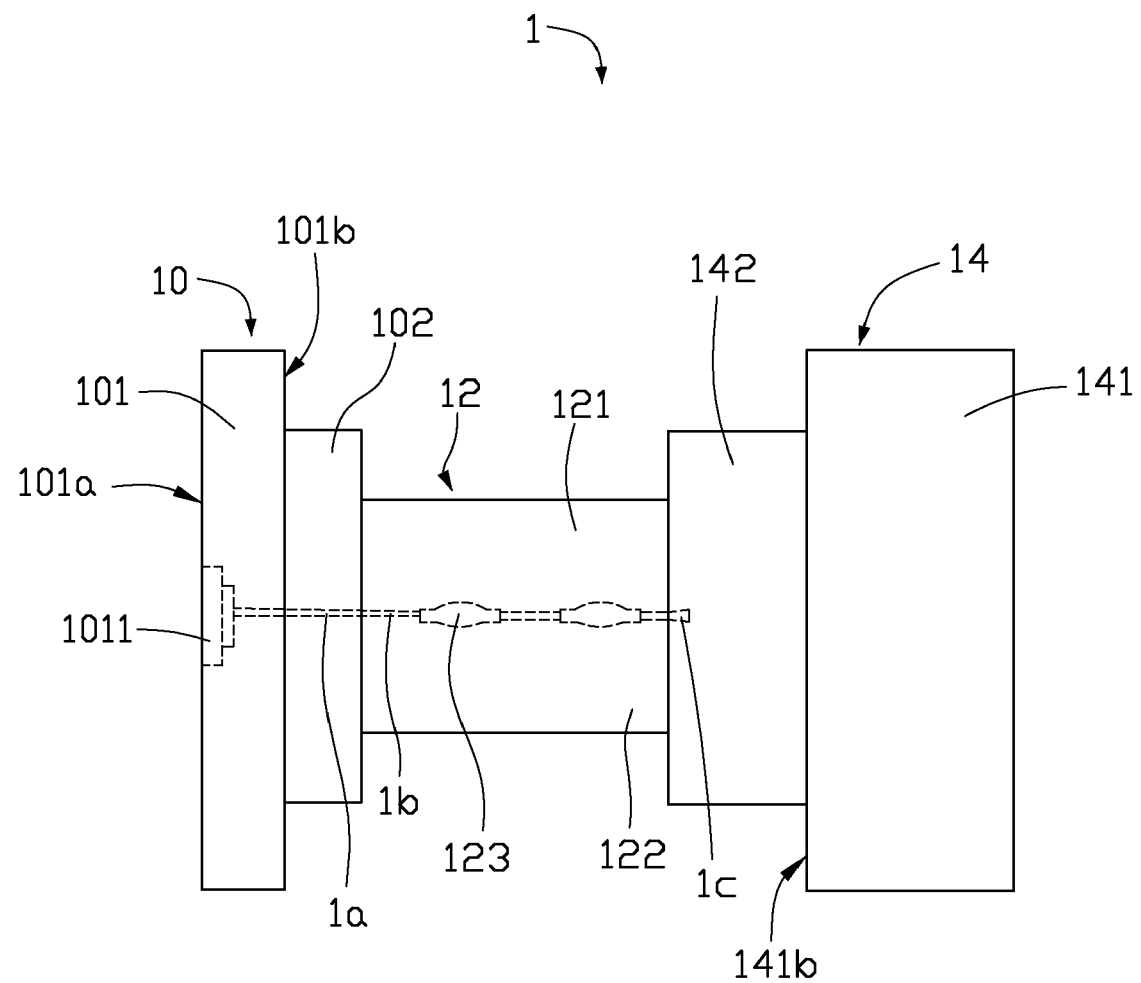
FIG. 1 is a cross-section of the lens mold as disclosed, the lens mold including an upper slide, a lower slide, and a shaping portion between the upper and lower slides.
Figure 2:
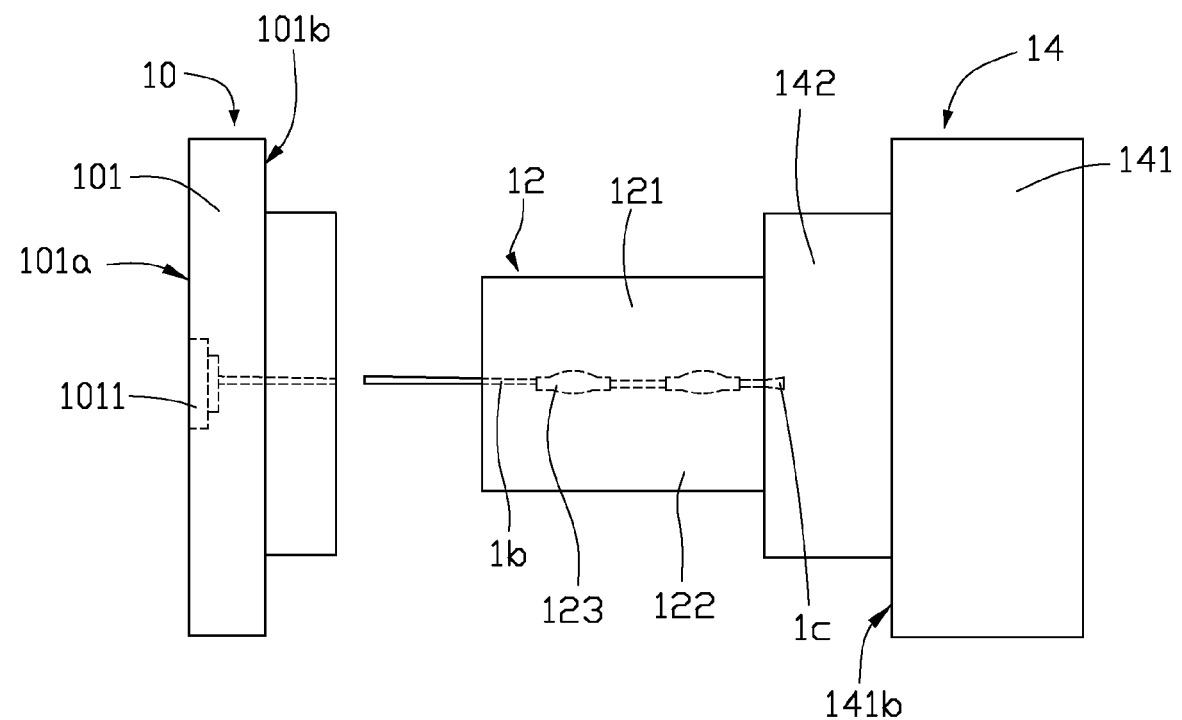
FIG. 2 is a cross-section of the lens mold as disclosed when the mold is opened.
Figure 3:
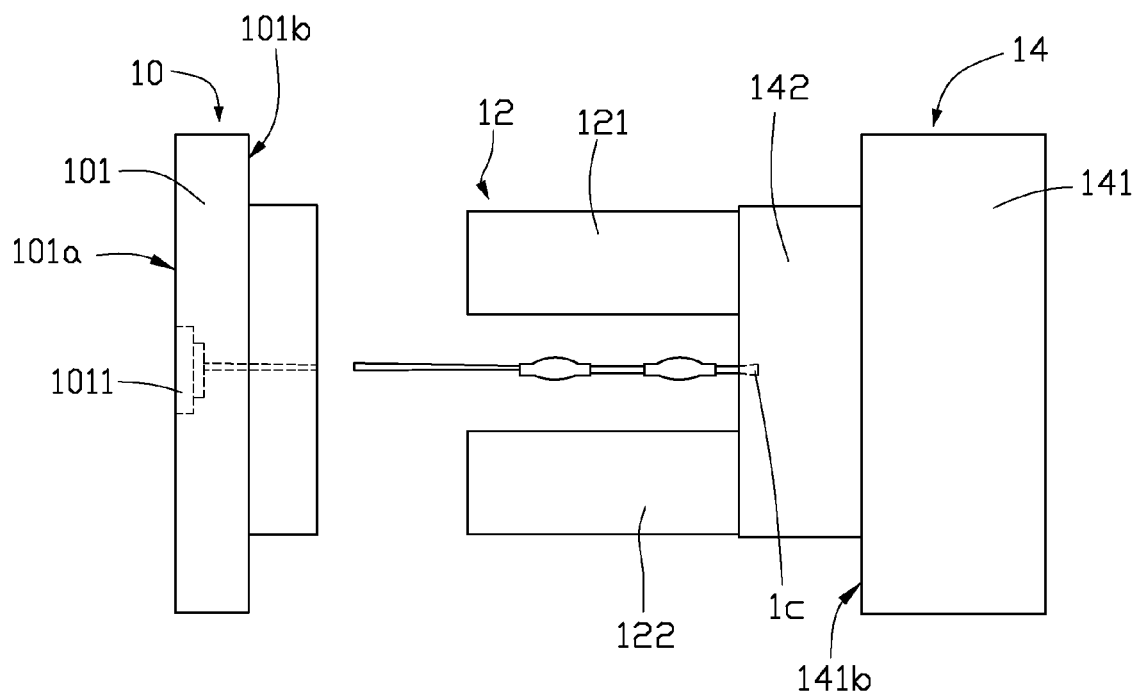
FIG. 3 is a cross-section of the lens mold as disclosed showing the upper slide and the lower slide separated from each other and a plurality of joined lenses ready for removal from the mold.

FIG. 1 shows a lens mold 1 comprising a first pressing portion 10, a shaping portion 12, and a second pressing portion 14. The shaping portion 12 is disposed between the first pressing portion 10 and the second pressing portion 14, wherein the first pressing portion 10 and the second pressing portion 14 are both configured for tightly pressing the shaping portion 12.

The first pressing portion 10 comprises a first base 101 and a first pad 102. An inlet 1011 is disposed near the center of a surface 101a of the first base 101, away from the shaping portion 12. The first pad 102 is disposed on a surface 101b of the first base 101, in proximity to the shaping portion 12. An injection path 1a is extended from the inlet 1011 to the shaping portion 12.

The second pressing portion 14 comprises a second base 141 and a second pad 142. The second pad 142 is disposed on a surface 141b, in proximity to the shaping portion 12. A recess 1c is disposed on a surface of the second pad 142, in proximity to the shaping portion.

Figure 4:
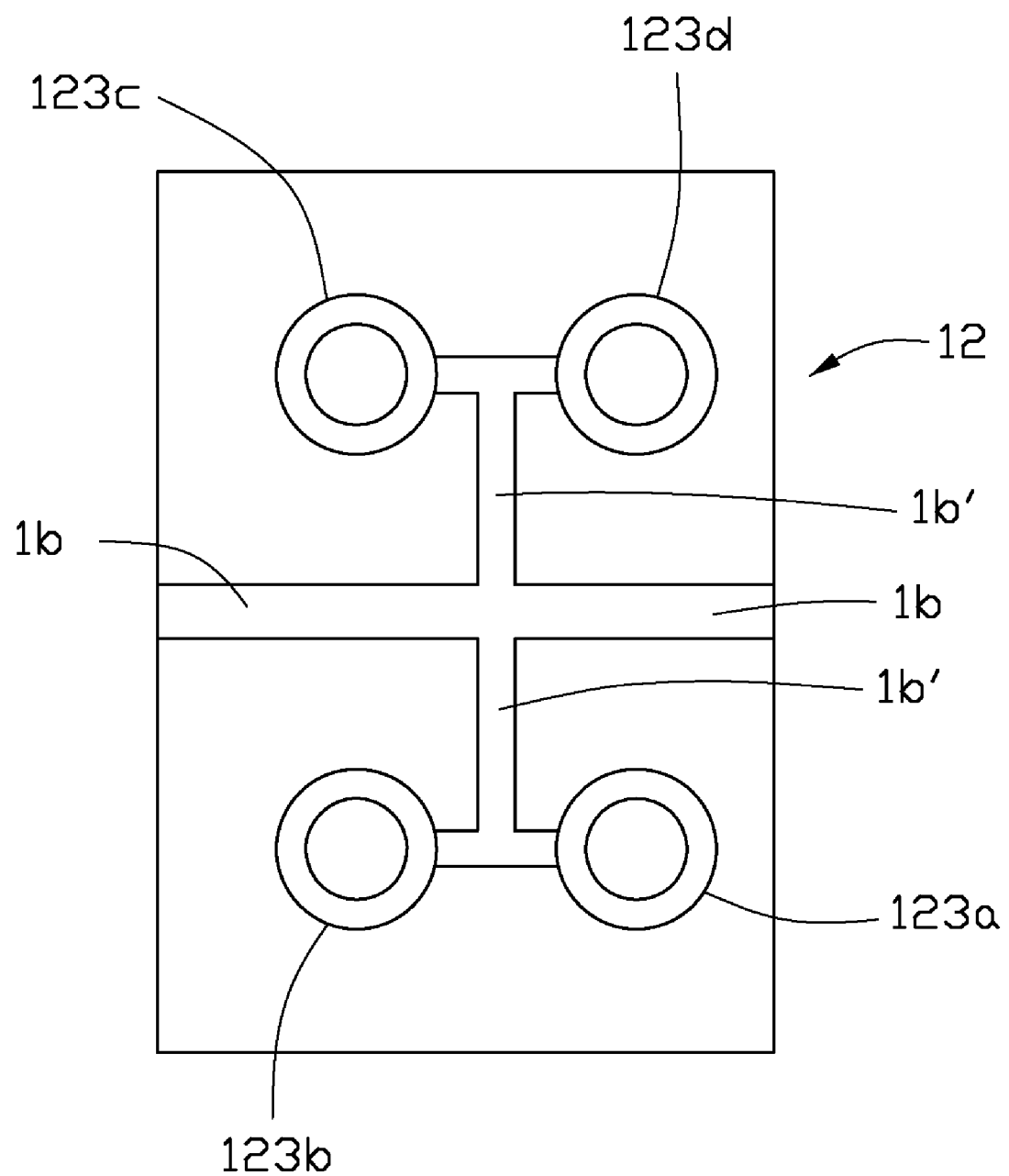
FIG. 4 is a top view of the lower slide of the shaping portion in the lens mold as disclosed.

As shown in FIG. 1 and FIG. 4, the shaping portion 12 is disposed between the first pressing portion 10 and the second pressing portion 14, and comprises an upper slide 121 and a lower slide 122. When the upper slide 121 and the lower slide 122 close together, a mold cavity 123 and a flow path 1b are formed internally for shaping four lenses, and the mold cavity 123 and the flow path 1b are in fluidic communication with each other. In the present embodiment, the mold cavity 123 comprises four mold cavities 123a, 123b, 123c, and 123d, and the mold cavities 123a, 123b, 123c, and 123d are contoured so as to define at least one surface of each of four lenses, respectively. As FIG. 4 shows, the four mold cavities 123a, 123b, 123c, and 123d are symmetrically distributed on two opposite sides of the flow path 1b. The upper slide 121 and the lower slide 122 are connected to the second pad 142, and are configured for sliding relative to the second pad 142 via a pulley or rail system. Accordingly, the upper slide 121 and the lower slide 122 achieve the mold release.

Referring to FIGS. 1-4, when the upper slide 121 and the lower slide 122 close, melted plastic flows through the inlet 1011 of the first pressing portion 10 into the flow path 1b of the shaping portion 12 along the injection path 1a. The melted plastic then fills the four mold cavities 123a, 123b, 123c, and 123d through two branch flow paths 1b', wherein a portion of the melted plastic is also received in the recess 1c. In the illustrated embodiment, each of the branch flow paths 1b is T-shaped. One of the branch flow paths 1b communicates with the mold cavities 123a and 123b, and the other branch flow path 1b communicates with the mold cavities 123c and 123d. The melted plastic is cooled inside the shaping portion 12, and shaped into a lens framework that includes four lenses. After the lens framework is shaped, the first pressing portion 10 is separated from the shaping portion 12, and the upper slide 121 slips upwards and the lower slide 122 downwards so as to slip away from each other. Because the shaped lens framework is partially received in the recess 1c, the shaped lens framework is released from the upper slide 121 and the lower slide 122, and can be removed from the mold by a robot manipulator. Thus, the lens framework partially received in the recess 1c is not subject to the risk of damage that can be caused by a pushing pin. In particular, the four lenses in the lens framework are not subject to the risk of damage that can be caused by a pushing pin.

While the invention has been described by way of example and in terms of a preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens mold, comprising:
   a first pressing portion defining an inlet to receive material to make a plurality of lenses;
   a second pressing portion;
   a shaping portion disposed between the first pressing portion and the second pressing portion, the shaping portion comprising an upper slide and a lower slide connected to the second pressing portion, the upper and lower slides configured for sliding along each other;
   a plurality of mold cavities in fluidic communication with a flow path, the flow path having a plurality of branch flow paths extending to the mold cavities, and the flow path being in fluidic communication with the inlet such that the lens material flows from the inlet along the flow path and the branch flow paths to the mold cavities, the mold cavities contoured to define at least one surface of each of the lenses, wherein contours of the mold cavities, the flow path and the branch flow paths are defined when the upper slide and lower slide close; and
   a recess defined on a surface of the second pressing portion that is adjacent to the shaping portion, the recess in fluidic communication with the flow path when the upper slide and the lower slide close so as to receive a portion of the lens material;
   wherein the first pressing portion comprises a first base and a first pad disposed on a surface of the first base that is in proximity to the shaping portion, and the second pressing portion includes a second base and a second pad provided on a surface of the second base that is adjacent to the shaping portion, the upper slide and the lower slide being connected to the second pad of the second pressing portion.

2. The mold as claimed in claim 1, wherein the recess is defined on the surface of the second pad.

3. The mold as claimed in claim 1, wherein the mold cavities are symmetrically distributed on opposite sides of the flow path.

4. The mold as claimed in claim 1, wherein the upper slide and the lower slide are connected to the second pressing portion via a pulley or a rail system.

5. A lens mold, comprising:
a first pressing portion defining an inlet to receive molten material for making at least one lens;
a second pressing portion; and
a shaping mechanism disposed between the first pressing portion and the second pressing portion, the shaping mechanism comprising an upper sliding portion and a lower sliding portion both movably connected to the second pressing portion, the upper and lower sliding portions configured for selectively sliding toward each other or away from each other;
wherein a surface of the second pressing portion that is adjacent to the shaping mechanism has a recess defined therein;
the first and second pressing portions are configured for tightly pressing the shaping mechanism when the upper and lower sliding portions are closed together;
when the upper and lower sliding portions are closed together, they cooperatively define at least one mold cavity, a flow channel, and at least one branch channel, the at least one branch channel fluidically intercommunicates each of the at least one mold cavity with the flow channel, an end of the flow channel is in fluidic communication with the inlet, an opposite end of the flow channel is in fluidic communication with the recess, and the at least one mold cavity is contoured to define at least one surface of the at least one lens; and
when the molten lens material flows from the inlet into the flow channel and the at least one mold cavity, some of the molten lens material is received in the recess.

6. The lens mold as claimed in claim 5, wherein the at least one mold cavity comprises four mold cavities, the at least one branch channel comprises two T-shaped branch channels, two of the mold cavities are located at a lateral side of the flow channel, another two of the mold cavities are located at an opposite lateral side of the flow channel, the two pairs of mold cavities are symmetrically arranged about the flow path, one of the branch channels fluidically intercommunicates the two mold cavities at said lateral side of the flow channel with the flow channel, and the other branch channel fluidically intercommunicates the two mold cavities at said opposite lateral side of the flow channel with the flow channel.

* * * * *